United States Patent
Ozawa

(10) Patent No.: US 12,492,157 B2
(45) Date of Patent: Dec. 9, 2025

(54) METHOD FOR PRODUCING METHANOL

(71) Applicant: Sumitomo Chemical Company, Limited, Tokyo (JP)

(72) Inventor: Takuya Ozawa, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 450 days.

(21) Appl. No.: 18/023,680

(22) PCT Filed: Aug. 30, 2021

(86) PCT No.: PCT/JP2021/031682
§ 371 (c)(1),
(2) Date: Feb. 27, 2023

(87) PCT Pub. No.: WO2022/045327
PCT Pub. Date: Mar. 3, 2022

(65) Prior Publication Data
US 2024/0025827 A1    Jan. 25, 2024

(30) Foreign Application Priority Data
Aug. 31, 2020  (JP) .................. 2020-145864

(51) Int. Cl.
*C07C 29/151* (2006.01)
*B01J 23/78* (2006.01)
*B01J 23/80* (2006.01)

(52) U.S. Cl.
CPC .......... *C07C 29/1514* (2013.01); *B01J 23/78* (2013.01); *B01J 23/80* (2013.01)

(58) Field of Classification Search
CPC ........ C07C 29/154; C07C 31/04; B01J 23/78; B01J 23/80; B01J 23/72
See application file for complete search history.

(56) References Cited

U.S. PATENT DOCUMENTS

| | | | |
|---|---|---|---|
| 4,436,833 A | 3/1984 | Broecker et al. | |
| 4,552,861 A | 11/1985 | Courty et al. | |
| 4,596,782 A | 6/1986 | Courty et al. | |
| 5,089,532 A * | 2/1992 | King | C07C 29/154 518/713 |
| 2005/0080148 A1 | 4/2005 | Adebeck et al. | |
| 2009/0048355 A1 | 2/2009 | Polier et al. | |
| 2011/0136924 A1 | 6/2011 | Fujimoto et al. | |
| 2013/0237618 A1 | 9/2013 | Matsushita et al. | |
| 2015/0111975 A1 | 4/2015 | Goto et al. | |
| 2017/0240492 A1 | 8/2017 | Kambe et al. | |

FOREIGN PATENT DOCUMENTS

| | | |
|---|---|---|
| CL | 201103195 | 12/2011 |
| CN | 102015105 A | 4/2011 |
| GB | 2203427 A | 10/1988 |
| JP | S5426983 A | 2/1979 |
| JP | S5562030 A | 5/1980 |
| JP | S6045539 A | 3/1985 |
| JP | 60190232 | 9/1985 |
| JP | S60190232 A | 9/1985 |
| JP | 60209255 | 10/1985 |
| JP | S60209255 A | 10/1985 |
| JP | 64500436 | 2/1989 |
| JP | 64500436 A | 2/1989 |
| JP | H064137 A | 1/1994 |
| JP | 2005537119 A | 12/2005 |
| JP | 2008540077 A | 11/2008 |
| JP | 5426983 B2 | 2/2014 |
| JP | 5562030 B2 | 7/2014 |
| JP | 6045539 B2 | 12/2016 |
| JP | 6666595 B2 | 3/2020 |
| WO | 2010146380 A1 | 12/2010 |
| WO | 2012067222 A1 | 5/2012 |
| WO | 2013183577 A1 | 12/2013 |

OTHER PUBLICATIONS

Fujitani et al., The chemical modification seen in the Cu/Zn methanol synthesis catalyst, (Applied Catalysis A: General 191 (2000) 111-129).*
International Preliminary Report and Written Opinion issued Oct. 19, 2021 in Application No. PCT/JP2021/031682.
International Search Report issued Oct. 19, 2021 in Application No. PCT/JP2021/031682.
Examiner's Report issued Dec. 28, 2023 in CL Application No. 202300558.
Office Action issued Dec. 7, 2023 in CN Application No. 202180051490.6.
Office Action issued Dec. 25, 2023 in SA Application No. 523442737.
Decision of Rejection issued May 24, 2024 in CN Application No. 202180051490.6.
International Preliminary Report issued Feb. 28, 2023 in Application No. PCT/JP2021/031682.

* cited by examiner

*Primary Examiner* — Jafar F Parsa
(74) *Attorney, Agent, or Firm* — Panitch Schwarze Belisario & Nadel LLP

(57) ABSTRACT

Provided is a method which is for producing methanol and which achieves high catalyst stability over time. This method for producing methanol includes the step of bringing a raw material gas into contact with a catalyst to obtain methanol, the raw material gas containing a carbon oxide and hydrogen, the catalyst containing (i) copper and zinc at a molar ratio of the zinc relative to the copper (Zn/Cu) of 0.3 to 0.45, and (ii) an alkali metal in an amount of 0% by mass to 0.05% by mass.

3 Claims, No Drawings

METHOD FOR PRODUCING METHANOL

CROSS-REFERENCE TO RELATED APPLICATIONS

This application is a Section 371 of International Application No. PCT/JP2021/031682, filed Aug. 30, 2021, which was published in the Japanese language on Mar. 3, 2022 under International Publication No. WO 2022/045327 A1, which claims priority under 35 U.S.C. § 119(b) to Japanese Application No. 2020-145864, filed Aug. 31, 2020, the disclosures of which are incorporated herein by reference in their entireties.

TECHNICAL FIELD

The present invention relates to a method for producing methanol, the method including the step of bringing, into contact with a catalyst, a raw material gas that contains a carbon oxide and hydrogen.

BACKGROUND ART

Methanol is an industrially important basic raw material. Accordingly, in consideration of, for example, energy conservation and economical efficiency, there has been a demand for a more efficient production process for methanol. A general methanol synthesis process uses, as main raw materials, hydrogen and a carbon oxide which is a carbon source and which is derived from a syngas. In such a synthesis process, it is known that a catalyst composed of copper and zinc oxide (Cu—ZnO catalyst) is used.

In a reaction in which methanol is synthesized from a carbon oxide and hydrogen, elementary reactions and reverse reactions thereof as below occur simultaneously, and the reactions proceed while being affected by chemical equilibrium.

$$CO_2 + 3H_2 \rightarrow CH_3OH + H_2O$$

$$CO + H_2O \rightarrow CO_2 + H_2$$

$$CO + 2H_2 \rightarrow CH_3OH$$

As a catalyst for accelerating such a methanol synthesis reaction, for example, Patent Literature 1 discloses a catalyst in which a molar ratio of zinc relative to copper is 0.5 to 0.7. Patent Literature 1 indicates that the catalyst may contain an alkali metal in an amount of 0 mol % to 0.2 mol %.

CITATION LIST

Patent Literature

[Patent Literature 1]
  Pamphlet of International Publication No. WO 2013/183577

SUMMARY OF INVENTION

Technical Problem

Unfortunately, in a conventional method for producing methanol, the catalyst does not always have a satisfactory lifetime. Thus, there has been a demand for a methanol production method which achieves better catalyst stability.

It is an object of an embodiment of the present invention to provide a method which is for producing methanol and which achieves high catalyst stability over time.

Solution to Problem

The present invention includes the following arrangements.

<1>
A method for producing methanol, the method including the step of bringing a raw material gas into contact with a catalyst to obtain methanol, the raw material gas containing a carbon oxide and hydrogen,
  the catalyst containing
    (i) copper and zinc at a molar ratio of the zinc relative to the copper (Zn/Cu) of 0.3 to 0.45, and
    (ii) an alkali metal in an amount of 0% by mass to by mass.
<2>
The method for producing methanol according to <1>, wherein the raw material gas contains water.
<3>
The method for producing methanol according to <1> or <2>, wherein the alkali metal is sodium.
<4>
The method for producing methanol according to <3>, wherein the catalyst contains sodium in an amount of 0.01% by mass to 0.05% by mass.

Advantageous Effects of Invention

An embodiment of the present invention provides a method which is for producing methanol and which achieves high catalyst stability over time.

DESCRIPTION OF EMBODIMENTS

The following will describe an embodiment of the present invention. The present invention is, however, not limited to such an embodiment. The present invention is not limited to arrangements described below, but may be altered in various ways by a skilled person within the scope of the claims. The present invention also encompasses, in its technical scope, any embodiment based on a proper combination of technical means disclosed in differing embodiments. Note that any numerical range expressed as "A to B" herein means "not less than A and not more than B" unless otherwise stated.

[Method for Producing Methanol]

The method for producing methanol in accordance with an embodiment of the present invention includes the step of bringing a raw material gas into contact with a catalyst to obtain methanol, the raw material gas containing carbon oxide and hydrogen, and the catalyst containing copper and zinc. As described later, the catalyst has a specific composition and has excellent stability over time. Therefore, this production method in accordance with an embodiment of the present invention allows for stable production for a long period of time.

In the step, reaction conditions can be set, for example, as follows: a reaction temperature of 150° C. to 300° C.; and a reaction pressure (gauge pressure) of 0.5 MPa-G to 10 MPa-G. In the production method in accordance with an embodiment of the present invention, carbon monoxide is normally generated as a by-product. Note, however, that carbon monoxide may be generated as a main product depending on reaction conditions.

Examples of a reactor that is used in the step include a fixed bed reactor. It is also suitable to employ a reactor which has a condensation surface and which can condense, in the reactor, a high-boiling component that contains resultant methanol and water.

[Raw Material Gas]

A raw material gas contains a carbon oxide and hydrogen. The carbon oxide is carbon monoxide and/or carbon dioxide. In a case where both the carbon monoxide and the carbon dioxide are used as the carbon oxide, the carbon monoxide and the carbon dioxide may be contained at any ratio.

In the raw material gas, a molar ratio of hydrogen relative to the carbon oxide is not limited to a particular value, but can be any value. The raw material gas may contain a component other than the carbon oxide and the hydrogen, provided that the other component does not affect production of methanol. Examples of such a component include a third component such as nitrogen, and an impurity such as a by-product associated with production of the carbon oxide.

The raw material gas may further contain water. Normally, in production of methanol, it is preferable that the raw material gas contain water in as small an amount as possible. However, the production method in accordance with an embodiment of the present invention allows the catalyst to stay stable even when the raw material gas contains a certain amount of water.

The lower limit of the partial pressure of water vapor at the inlet of the reactor is not less than 0.05 kPa, not less than kPa, not less than 5 kPa, not less than 10 kPa, not less than 20 kPa, not less than 30 kPa, not less than 40 kPa, or not less than 45 kPa. In addition, the upper limit of the partial pressure of the water vapor at the inlet of the reactor is not more than 300 kPa, not more than 200 kPa, not more than 150 kPa, 100 kPa, not more than 90 kPa, not more than 80 kPa, not more than 70 kPa, not more than 60 kPa, or not more than 50 kPa.

The carbon oxide, hydrogen, and water vapor may be introduced into the reactor separately from each other. Alternatively, the carbon oxide, hydrogen, and water vapor may be introduced into the reactor as a mixed gas composed of any combination thereof.

[Catalyst]

The catalyst used for producing methanol in an embodiment of the present invention is a catalyst containing copper and zinc. The copper may be in the form of a copper oxide (CuO) or may be in the form of a simple substance (Cu). Constituent components of the catalyst are not limited to the above-described components, but may contain another element.

In the catalyst, a molar ratio of zinc relative to copper (Zn/Cu) is 0.30 to 0.45, and preferably 0.30 to 0.40. The molar ratio which is too small makes it more likely that Cu crystal condenses. This may leads to acceleration of decrease in activity of the catalyst. In contrast, the molar ratio which is too large decreases an amount of Cu, which is an active component. This may lead to decrease in the activity.

The catalyst may further contain an alkali metal. The alkali metal may be contained, in the catalyst, in an amount whose lower limit is not less than 0% by mass, not less than 0.001% by mass, not less than 0.01% by mass, or not less than 0.015% by mass and whose upper limit is not more than by mass, not more than 0.04% by mass, or not more than 0.03% by mass. The alkali metal contained in too large an amount makes it more likely that the Cu crystal condenses. This may lead to acceleration of decrease in the activity of the catalyst. The amount of the alkali metal contained in the catalyst may be 0% by mass.

Examples of the alkali metal include Na, K, and Rb. In an embodiment, the alkali metal is Na.

[Method for Producing Catalyst]

The catalyst used for production of methanol in an embodiment of the present invention can be produced by any method, and may be produced by a conventional method. The catalyst can be produced, for example, by drying and calcining a precipitate which has been obtained by subjecting, to precipitation with a precipitant, aqueous solutions of acid salts of respective metal elements that constitute the catalyst (see Japanese Patent Application Publication, Tokukai, No. 2010-194421).

[Use of Catalyst]

In the production method in accordance with an embodiment of the present invention, the above-described catalyst may be used as it is for an embodiment of the present invention, or the catalyst may be used after reduced with use of a reducing gas (for example, hydrogen, a mixed gas of hydrogen and nitrogen, or a gas containing carbon monoxide). In one preferable aspect for, for example, a case where the catalyst is a CuO—ZnO catalyst, after the CuO—ZnO catalyst is changed into a Cu—ZnO catalyst in a reduced state by bringing the CuO—ZnO catalyst into contact with a gas containing hydrogen, the Cu—ZnO catalyst is put in contact with the raw material gas.

When the catalyst is charged into the reactor, it is possible to mix together the catalyst and various diluents that are inert with respect to the raw material gas and a reaction product. Examples of such a diluent include copper, alumina, zirconia, quartz, glass, and silicon carbide. The diluent may be formed to have, for example, a granular shape, a spherical shape, a columnar shape or the like, or an indefinite irregular shape. In a case where copper is used as the diluent, the copper is excluded from calculation of the molar ratio of Zn/Cu in the catalyst.

EXAMPLES

The following will more specifically describe the present invention with reference to Examples and Comparative Examples. Note, however, that the present invention is not limited to the Examples.

In Examples and Comparative Examples, an activity retention is a value defined by the formula below. The activity retention is an index indicative of a decrease in activity of a catalyst over time. The activity retention which is higher indicates that the decrease in the activity of the catalyst over time is suppressed more.

Activity retention (%)=[conversion of carbon dioxide after 15 hours from start of reaction]/[conversion of carbon dioxide after 2 hours from start of reaction]×100

Example 1

A CuO—ZnO catalyst (Zn/Cu molar ratio: 0.35, sodium content: 0.03% by mass) was sieved so as to have a particle size of 0.5 mm to 1.7 mm. Then, 2 g of the CuO—ZnO catalyst sieved was mixed with copper granules (0.8 mm to 2 mm), so that a total amount of a resultant mixture was 3 mL. The mixture was charged into a monotubular fixed bed reactor (inner diameter: 12 mm) made of stainless steel. Subsequently, hydrogen (7 NmL/min) and argon (133 NmL/min) were caused to flow in the reactor, and a temperature of a catalyst layer was increased to 150° C. After that, temperature of the catalyst layer was increased at a rate of 1° C./min from 150° C. to 300° C., and then was kept at 300° C. for 2 hours.

A mixed gas composed of carbon dioxide (24% by volume), hydrogen (72% by volume), and nitrogen (4% by volume) was supplied, into the reactor, at a temperature of 240° C., at a gauge pressure of 0.80 MPa-G, and at a flow rate of 250 NmL/min. Simultaneously, gasified water was supplied into the reactor at a flow rate of 0.01 g/min. The water vapor pressure at an inlet of the reactor at that time was calculated to be 47 kPa. Methanol could be thus obtained.

The conversion of carbon dioxide which was a raw material was 7.7% after 2 hours from the start of contact of the raw material gas with the catalyst. The conversion of the carbon dioxide which was a raw material was 7.6% after 15 hours from the start of the contact of the raw material gas with the catalyst. Thus, the activity retention was 99%. As described above, in Example 1, the conversion hardly decreased even after 15 hours had elapsed from the start of supply of the raw material gas.

Example 2

The same operations as those in Example 1 were performed except that the sodium content in the CuO—ZnO catalyst used was 0.05% by mass. The conversion of carbon dioxide which was a raw material was 6.7% after 2 hours from the start of contact of the raw material gas with the catalyst. The conversion of the carbon dioxide which was a raw material was 5.6% after 15 hours from the start of the contact of the raw material gas with the catalyst. Thus, the activity retention was 84%. As described above, in Example 2, a decrease of the conversion was observed after 15 hours had elapsed from the start of supply of the raw material gas, but the decrease was within an allowable range.

Comparative Example 1

The same operations as those in Example 1 were performed except that (i) the Zn/Cu molar ratio in the CuO—ZnO catalyst used was 0.34, (ii) the sodium content was 0.06% by mass, and (iii) the inner diameter of a reactor was 15.5 mm. The conversion of carbon dioxide which was a raw material was 5.3% after 2 hours from the start of contact of the raw material gas with the catalyst. The conversion of the carbon dioxide which was a raw material was 2.3% after 15 hours from the start of the contact of the raw material gas with the catalyst. Thus, the activity retention was 43%. As described above, in Comparative Example 1, a significant decrease of the conversion was observed after 15 hours had elapsed from the start of supply of the raw material gas.

Comparative Example 2

The same operations as those in Example 1 were performed except that (i) the Zn/Cu molar ratio in the CuO—ZnO catalyst used was 0.17, and (ii) the sodium content was by mass. The conversion of carbon dioxide which was a raw material was 4.6% after 2 hours from the start of contact of the raw material gas with the catalyst. The conversion of the carbon dioxide which was a raw material was 3.4% after hours from the start of the contact of the raw material gas with the catalyst. Thus, the activity retention was 73%. As described above, in Comparative Example 2, the activity was low, and a significant decrease of the conversion was observed after 15 hours had elapsed from the start of supply of the raw material gas.

Example 3

A CuO—ZnO catalyst (Zn/Cu molar ratio: 0.35, sodium content: 0.03% by mass) was sieved so as to have a particle size of 0.5 mm to 1.7 mm. Then, 2 g of the CuO—ZnO catalyst sieved was mixed with copper granules (0.8 mm to 2 mm), so that a total amount of a resultant mixture was 3 mL. The mixture was charged into a monotubular fixed bed reactor (inner diameter: 12 mm) made of stainless steel. Subsequently, hydrogen (7 NmL/min) and argon (133 NmL/min) were caused to flow in the reactor, and a temperature of a catalyst layer was increased to 150° C. After that, temperature was increased at a rate of 1° C./min from 150° C. to 300° C., and then was kept at 300° C. for 2 hours.

A mixed gas composed of carbon dioxide (24% by volume), hydrogen (72% by volume), and nitrogen (4% by volume) was supplied, into the reactor, at a temperature of 240° C., at a gauge pressure of 0.80 MPa-G, and at a flow rate of 250 NmL/min. Simultaneously, 7 NmL/min of hydrogen gas was bubbled in water having a temperature of 25° C. A resultant hydrogen gas (water partial pressure: 3 kPa) which had been saturated with water vapor until the saturated water vapor pressure had been reached was supplied into the reactor together with the mixed gas. The water vapor pressure at an inlet of the reactor at that time was calculated to be 0.08 kPa. Methanol could be thus obtained.

The conversion of carbon dioxide which was a raw material was 14.5% after 2 hours from the start of contact of the raw material gas with the catalyst. The conversion of the carbon dioxide which was a raw material was 14.2% after 15 hours from the start of the contact of the raw material gas with the catalyst. Thus, the activity retention was 98%. As described above, in Example 3, the conversion hardly decreased even after 15 hours had elapsed from the start of supply of the raw material gas.

Example 4

The same operations as those in Example 3 were performed except that (i) the Zn/Cu molar ratio in the CuO—ZnO catalyst used was 0.44, and (ii) the sodium content was 0.03% by mass. The conversion of carbon dioxide which was a raw material was 10.8% after 2 hours from the start of contact of the raw material gas with the catalyst. The conversion of the carbon dioxide which was a raw material was 10.3% after hours from the start of the contact of the raw material gas with the catalyst. Thus, the activity retention was 96%. As described above, in Example 4, the conversion hardly decreased even after 15 hours had elapsed from the start of supply of the raw material gas.

Example 5

Employed was a reactor which had a condensation surface and which could condense, in the reactor, a high-boiling component that contained resultant methanol and water. The reactor had a structure in which a main body (inner diameter: 26 mm) made of stainless steel, a perforated metal inner cylinder (outer diameter: 15 mm, thickness: 0.5 mm) made of stainless steel, and a cooling tube (outer diameter: 6 mm) made of stainless steel were concentrically provided. A CuO—ZnO catalyst (Zn/Cu molar ratio: 0.35, sodium content: 0.03% by mass) was sieved so as to have a particle size of 0.5 mm to 1.7 mm. Then, 1.6 g of the CuO—ZnO catalyst sieved was mixed with copper granules (0.8 mm to 2 mm), so that a total amount of a resultant mixture was 18 mL. The mixture thus obtained was charged into a space between the main body of the reactor and the inner cylinder of the reactor. There is an empty space between the inner cylinder and the cooling tube. Gas and condensed components could thus move between the catalyst layer and the cooling tube.

Hydrogen (7 NmL/min) and argon (133 NmL/min) were caused to flow in the reactor, and a temperature of a catalyst layer was increased to 150° C. After that, temperature was increased at a rate of 1° C./min from 150° C. to 300° C., and then was kept at 300° C. for 2 hours.

A mixed gas composed of carbon dioxide (24% by volume), hydrogen (72% by volume), and nitrogen (4% by volume) was supplied, into the reactor, at a temperature of 240° C., at a cooling water temperature of 10° C., at a gauge pressure of 0.90 MPa-G, and at a flow rate of 50 NmL/min. Simultaneously, gasified water was supplied into the reactor at a flow rate of 0.01 g/min. The water vapor pressure at an inlet of the reactor at that time was calculated to be 196 kPa. Methanol could be thus obtained.

The conversion of carbon dioxide which was a raw material was 43.6% after 2 hours from the start of contact of the raw material gas with the catalyst. The conversion of the carbon dioxide which was a raw material was 43.8% after 15 hours from the start of the contact of the raw material gas with the catalyst. Thus, the activity retention was 100%. As described above, in Example 5, the conversion hardly decreased even after 15 hours had elapsed from the start of supply of the raw material gas.

Example 6

Employed was the reactor employed in Example 5. A CuO—ZnO catalyst (Zn/Cu molar ratio: 0.35, sodium content: by mass) was sieved so as to have a particle size of 0.5 mm to 1.7 mm. Then, 1.6 g of the CuO—ZnO catalyst sieved was mixed with copper granules (0.8 mm to 2 mm), so that a total amount of a resultant mixture was 18 mL. The mixture thus obtained was charged into a space between the main body of the reactor and the inner cylinder of the reactor.

Hydrogen (7 NmL/min) and argon (133 NmL/min) were caused to flow in the reactor, and a temperature of a catalyst layer was increased to 150° C. After that, temperature was increased at a rate of 1° C./min from 150° C. to 300° C., and then was kept at 300° C. for 2 hours.

A mixed gas composed of carbon dioxide (12% by volume), carbon monoxide (16% by volume), hydrogen (68% by volume), and nitrogen (4% by volume) was supplied, into the reactor, at a temperature of 240° C., at a cooling water temperature of 10° C., at a gauge pressure of 0.90 MPa-G, and at a flow rate of 50 NmL/min. Simultaneously, 7 NmL/min of hydrogen gas was bubbled in water having a temperature of 25° C. A resultant hydrogen gas (water partial pressure: 3 kPa) which had been caused to contain water in an amount corresponding to the saturated water vapor pressure was supplied into the reactor together with the mixed gas. The water vapor pressure at an inlet of the reactor at that time was calculated to be 0.37 kPa. Methanol could be thus obtained.

The conversion of carbon dioxide which was a raw material was 34.2% after 2 hours from the start of contact of the raw material gas with the catalyst. The conversion of the carbon dioxide which was a raw material was 34.2% after 15 hours from the start of the contact of the raw material gas with the catalyst. Thus, the activity retention was 100%. As described above, in Example 6, the conversion hardly decreased even after 15 hours had elapsed from the start of supply of the raw material gas

TABLE 1

|  | Zn/Cu molar ratio | Na concentration | Activity retention (%) | Conversion after 2 hours (%) | Conversion after 15 hours (%) |
|---|---|---|---|---|---|
| Example 1 | 0.35 | 0.03 | 99 | 7.7 | 7.6 |
| Example 2 | 0.35 | 0.05 | 84 | 6.7 | 5.6 |
| Example 3 | 0.35 | 0.03 | 98 | 14.5 | 14.2 |
| Example 4 | 0.44 | 0.03 | 96 | 10.8 | 10.3 |
| Example 5 | 0.35 | 0.03 | 100 | 43.6 | 43.8 |
| Example 6 | 0.35 | 0.03 | 100 | 34.2 | 34.2 |
| Comparative Example 1 | 0.34 | 0.06 | 43 | 5.3 | 2.3 |
| Comparative Example 2 | 0.17 | 0.02 | 73 | 4.6 | 3.4 |

[Result]

Example 1 and Comparative Example 1 differed from each other in that in Comparative Example 1, the sodium content in the catalyst exceeded 0.05% by mass. Example 1 and Comparative Example 2 differed from each other in that in Comparative Example 2, the Zn/Cu molar ratio in the catalyst was less than 0.3. In production methods in accordance with Comparative Examples 1 and 2, the activity retention decreased more significantly than in a production method in accordance with Example 1. On the other hand, as in Examples 3 to 6, even in a case where production conditions were employed under which the conversion was improved, the activity retention was sufficiently kept in production methods in accordance with those Examples.

INDUSTRIAL APPLICABILITY

An embodiment of the present invention can be used for production of methanol.

The invention claimed is:

1. A method for producing methanol, the method comprising the step of bringing a raw material gas into contact with a catalyst to obtain methanol, the raw material gas containing carbon oxide, hydrogen, and water,
   the catalyst containing
   (i) copper and zinc at a molar ratio of the zinc relative to the copper (Zn/Cu) of 0.3 to 0.45, and
   (ii) an alkali metal in an amount of 0.001% by mass to 0.05% by mass.

2. The method for producing methanol according to claim 1, wherein the alkali metal is sodium.

3. The method for producing methanol according to claim 2, wherein the catalyst contains sodium in an amount of 0.01% by mass to 0.05% by mass.

* * * * *